United States Patent Office 3,048,634
Patented Aug. 7, 1962

---

3,048,634
PRODUCTION OF KETOXIMES
Eugen Mueller, 9 Denzenberghalde, Horst Metzger, 7 Ulrichstrasse, and Dorla Fries, 8 Muehlstrasse, all of Tubingen, Germany
No Drawing. Filed Mar. 25, 1955, Ser. No. 496,946
Claims priority, application Germany Mar. 30, 1954
21 Claims. (Cl. 260—566)

This invention relates to a new method of producing ketoximes.

It is already known (cf. M. A. Naylor and A. W. Anderson, Journal of Organic Chemistry 18 (1953), page 115) that cyclohexanone oxime can be prepared by the action of nitrosyl chloride on cyclohexane in light.

This method is unsuitable for industrial conditions because it only proceeds without the formation of large amounts of by-products when it is carried out at very low temperatures ($-25°$ C.) while using very dilute nitrosyl chloride, so that the speed of reaction is unsatisfactory.

We have now found that ketoximes are obtained in an advantageous manner by allowing a mixture of nitric oxide and chlorine in which the nitric oxide is present in a large molecular excess with respect to the chlorine to act on a saturated aliphatic or cycloaliphatic hydrocarbon while irradiating with light and then, after separating the unreacted hydrocarbon, either heating the reaction product which remains as such for some time at about 50° to 150° C., or first reducing the 1-chlor-1-nitrosohydrocarbon formed as a by-product and only heating to about 50° to 150° C. the bis-nitroso-hydrocarbon formed as the main product.

Suitable initial materials include cyclohexane, cyclopentane, cycloheptane, cyclo-octane, methylcyclopentane, methylcyclohexane, heptane or dodecane. These hydrocarbons may be diluted with inert diluents, such as carbon tetrachloride.

For the reaction with the hydrocarbon it is good practice to use a mixture of nitric oxide and chlorine which contains about 2 to 15 mols of nitric oxide or more for each mol of chlorine. The gases are led into the hydrocarbon either as such or in admixture, preferably in a finely dispersed form. The most favorable temperatures and pressures vary in each case and are ascertainable by preliminary tests; in general the reaction is carried out at about $-10°$ to $+40°$ C. and at atmospheric or moderately increased pressure, as for example at 5 atmospheres.

The reaction, when using cyclohexane as initial material, presumably takes place according to the following scheme:

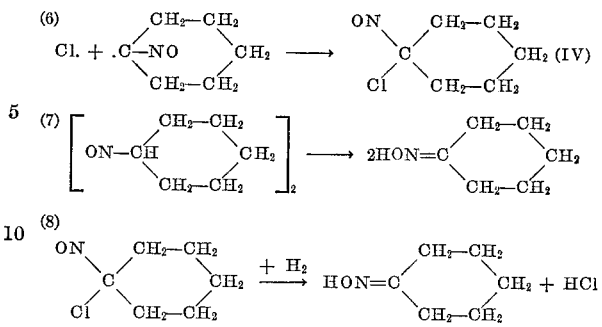

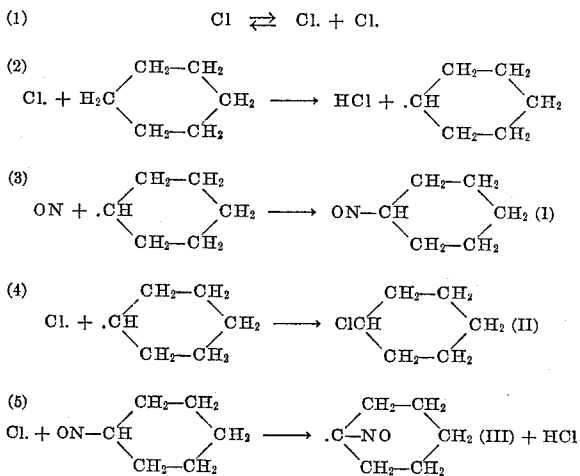

The reactions indicated are as follows: the chlorine molecule is split up into chlorine atoms under the excitation of light (1); the chlorine atoms react with the hydrocarbon with the formation of hydrogen chloride and alkyl radicals (2) which then either react with the nitric oxide with the formation of nitroso-hydrocarbon I (3) which dimerizes in known manner to its colorless bis-nitroso compound, or with a further chlorine atom to form a chloro-hydrocarbon II (4). The nitroso-hydrocarbon I or its dimer, respectively, can again react with chlorine atoms with the formation of hydrogen chloride and nitroso alkyl radicals III (5) which form 1-chloro-1-nitroso-hydrocarbon IV with nitric oxide (6). Reactions 7 and 8 can be carried out after separating the unchanged initial material and without irradiation. The conversion of the dimeric nitroso compound to oxime takes place for example by heating it to about 50° to 150° C., according to Equation 7, and that of the 1-chlor-1-nitroso-compound for example by reducing it according to Equation 8.

In the light reactions, small amounts of more highly chlorinated compounds and nitro compounds are formed as by-products. For activation of the chlorine molecule according to Equation 1 there may be used the sources of light usual for this purpose, as for example sunlight or the light of a mercury lamp, which if necessary is passed through a filter. Light of the wavelength 350 to 700 millimicrons has proved to be favorable.

The light reactions are preferably continued only until part of the hydrocarbon, for example 2 to 10%, has undergone reaction, working up then being effected for example by washing the reaction mixture with dilute caustic alkali solution, drying and then distilling off the unreacted hydrocarbon which can then be reacted again. The chlornitrosohydrocarbon and also the chloro-hydrocarbons formed as byproducts are recovered, if desired by fractional distillation, preferably under reduced pressure, and the bis-nitroso-hydrocarbon is retained as residue.

If a hydrocarbon saturated with the corresponding bis-nitroso compound be used as a starting material for the light reactions, the bis-nitroso compound formed during the reaction crystallizes out in a very pure state and can be sucked off before working up the reaction solution.

The reaction solution can also be worked up by leading them, after having washed them with dilute caustic alkali solution, through an alumina or silica gel or active carbon packed adsorption column in which the bis-nitroso and chlornitroso compounds are adsorbed quantitatively. These can be eluated by means of polar solvents, such as methanol or acetone, and transformed into oximes by heating the eluate or reducing it. The transformation proceeds as well, if the alumina or silica gel containing the adsorbed bis-nitroso compound is allowed to stand for some time at ordinary temperature.

The conversion of the bis-nitroso-hydrocarbon into the oxime according to Equation 7 is effected by heating, preferably in an inert solvent such as methanol, acetone or carbon tetrachloride, at about 50° to 150° C., or by means of Lewis acids such as alumina or silica gel.

The reduction of the chlor-nitroso-hydrocarbon according to Equation 8 can be carried out by catalytic hydrogenation, the known hydrogenation catalysts, such as platinum oxide, palladium or nickel, being used. The hydrogenation is interrupted as soon as the amount of hydrogen corresponding to the chlorine content has been absorbed. The reduction can also be carried out by means of reducing agents, such as iron or zinc and hydrochloric acid, hydrazine, hydroxylamine, alkali and alkaline earth sulfides, thiosulfates and bisulfites, alkali metal aluminum and borohydrides. The chlor-nitroso-hydrocarbon is also transformed into oxime by heating it, for example to about 50° to 150° C., or by irradiating it with red light.

The following examples will further illustrate this invention but the invention is not restricted to these examples.

Example 1

A mixture of 1400 cc. per hour of nitric oxide and 175 cc. per hour of chlorine (measured at 15° C. and 735 mm. Hg) is led in a state of fine dispersion into 300 cc. of cyclohexane at 20° to 25° C. while irradiating with the light of a mercury immersion lamp. After 5 hours, the green solution is washed with dilute caustic soda solution, the resultant blue solution is dried with sodium sulfate, the unreacted cyclohexane is distilled off at 150 mm. pressure and the residue is subjected to fractional distillation at 10 mm. pressure. At 35° to 50° C. there passes over a mixture of about equal parts of 1-chlor-1-nitrosocyclohexane and chlorinated cyclohexane, and there remain behind 4 to 4.8 grams of almost pure bis-nitrosocyclohexane of the melting point 110° C., which can be obtained completely pure by recrystallization from cyclohexane or by sublimation and then melts at 116.5° to 117° C.

For conversion into the cyclohexanone oxime, the bis-nitrosocyclohexane is heated to boiling in ethanol until the blue-green color of the monomeric nitroso compound which at first occurs by reason of the dissociation of the bis-compound has disappeared. By evaporation there is obtained an almost quantitative yield of cyclohexanone oxime of the melting point 88° to 89° C. (after recrystallization from petroleum ether).

The 1-chlor-1-nitrosocyclohexane is dissolved in 3 times the amount of ethyl acetate and, after the addition of about 5% of platinum oxide, is hydrogenated at room temperature with hydrogen until the blue color has disappeared. The partly precipitated cyclohexanone oxime hydrochloride is neutralized with caustic soda solution. Further amounts of cyclohexanone oxime are thus obtained.

Example 2

A mixture of nitric oxide and chlorine in the volumetric ratio 10:1 is led into cyclooctane in the light of a mercury lamp at 20° to 25° C. After 5 hours, the green reaction mixture is washed with dilute caustic alkali solution and the resultant blue solution is dried with sodium sulfate. The unreacted cyclooctane is then distilled off at a pressure of 30 to 50 mm. and the residue heated for 10 minutes at 110° C. The resultant product is extracted several times with 2-normal hydrochloric acid and then several times with 2-normal caustic soda solution. The extracts are combined, brought to the pH value 6 to 7 and extracted with ether several times. After drying and distilling off the ether, the residue is subjected to distillation under reduced pressure. Very pure cyclooctanone oxime is obtained which after recrystallization from petroleum ether melts at 40.5° to 41.5° C.

Example 3

The procedure of Example 2 is followed except that before heating the reaction product at 110° C., the 1-chloro-1-nitrosocyclooctane formed as a by-product is distilled off at greatly reduced pressure and is then catalytically hydrogenated as described in Example 1 or by means of hydrazine. A better total yield of cyclooctanone oxime is thus obtained.

Example 4

The procedure of Example 2 or 3 is followed but using the same amount of normal-heptane instead of the cyclooctane. A mixture of heptanone oximes having the boiling point 96° to 98° C. at 17 mm. pressure is obtained.

Example 5

The procedure of Example 2 or 3 is followed with methylcyclohexane as the initial material. Pure methylcyclohexanone oxime of the boiling point 104° C. at 15 mm. pressure is obtained.

Example 6

A mixture of 1400 cc. per hour of nitric oxide and 175 cc. per hour of chlorine is led at from 20° to 25° C., as a fine dispersion into a mixture of 100 cc. of cyclohexane and 200 cc. of carbon tetrachloride while irradiating with the light of a mercury immersion lamp. After 5 hours, the solution is washed with dilute caustic soda solution, the unreacted cyclohexane and the carbon tetrachloride are distilled off and the residue is further treated as described in Example 1, a very pure cyclohexanone oxime being obtained.

Example 7

Bis-nitrosocyclohexane obtained by any of the methods described in the foregoing examples is heated at about 120° C. until the blue color of the melt has disappeared. By distillation under reduced pressure there is obtained a practically quantitative yield of pure cyclohexanone oxime having a melting point of 90° to 91° C.

The transformation may also be carried out by introducing the bis-nitroso compound into pure molten cyclohexanone oxime and heating to 110° to 120° C. until the blue color has disappeared.

Example 8

A solution of pure bis-nitroso-cyclohexane in excess cyclohexane is led through an alumina or silica gel packed adsorption column. The column is kept in the dark for about 50 hours until there is no more unchanged nitroso compound left. The oxime formed is then eluated with methanol. After removing the solvent from the eluate, there is obtained a practically quantitative yield of cyclohexanone oxime melting at 88° to 89° C.

Example 9

Into a solution of pure 1-chlor-1-nitrosocyclohexane in about five volume parts of methanol a methanolic solution of hydrazine hydrate is introduced, while stirring and cooling until the blue color has disappeared one and one-half molecules of hydrazine being consumed. The mixture which has a neutral reaction is diluted with water and extracted with ether. After distilling off the ether, there are obtained about 90 percent of the theoretical amount of cyclohexanone oxime melting at 88° to 89.5° C.

Example 10

Into a solution of 14.7 grams of pure 1-chlor-1-nitrosocyclohexane in 75 cc. of methanol 2.5 grams of hydrazine hydrate (0.5 mol) are introduced and then, while stirring and cooling, an aqueous solution of 4.0 grams of caustic soda (1 mol) is added until the blue color has disappeared. When working up the neutral reaction mixture in the usual manner, cyclohexanone oxime is obtained in a yield of 95 percent of the theoretical amount.

Example 11

Into a solution of 14.7 grams of 1-chlor-1-nitrosocyclohexane in 75 cc. of methanol there is introduced an aqueous-methanolic solution of 6.9 grams (1 mol) of hydroxylamine hydrochloride and then, while stirring and cooling, an aqueous solution of 8.0 grams of caustic soda (2 mols) is added until the blue color has disappeared. When working up the neutral reaction mixture cyclohexanone oxime is obtained in good yields.

*Example 12*

Into a methanolic solution of a crude mixture of 1-chlor-1-nitrosocyclohexane and chlorcyclohexane there is introduced, while cooling and stirring, a solution of sodium bisulfite, care being taken that the reaction mixture remains weakly alkaline by adding small amounts of an aqueous caustic soda solution. When the blue color has disappeared, the mixture is worked up. There are obtained about 65 percent of the theoretical amount of cyclohexanone oxime.

Instead of sodium bisulfite there can be used sodium thiosulfate.

*Example 13*

1-chlor-1-nitrosocyclohexane is introduced, while well stirring, into a mixture of iron powder and aqueous hydrochloric acid. As soon as the blue color has disappeared, the mixture is filtered. The solution is neutralized by means of alkali and extracted with ether. After removing the ether there are obtained about 90 percent of the theoretical amount of pure cyclohexanone oxime.

Instead of iron powder, powdered zinc can be used with equal success.

*Example 14*

A methanolic solution of 1-chlor-1-nitrosocyclohexane is irradiated with sun light or with the light of an ordinary incandescent lamp or with red light having a wave length of about 650 millimicrons, until the blue color has disappeared. The brown solution is neutralized by means of barium or sodium carbonate and distilled with steam, pure cyclohexanone oxime being obtained in good yields.

Instead of irradiating, the methanolic solution of 1-chlor-1-nitrosocyclohexane can also be transformed into cyclohexanone oxime by boiling it under reflux until the blue color has disappeared.

*Example 15*

Cyclohexane is saturated with pure bis-nitrosocyclohexane obtained by the method described in any of the foregoing examples. This solution is treated with nitric oxide and chlorine according to Example 1. The bis-nitrosocyclohexane crystallizes out as formed during a 5 hours' reaction and is filtered off before working up the reaction mixture according to Example 1.

*Example 16*

The reaction mixture obtained by introducing nitric oxide and chlorine into cyclohexane while irradiating for 5 hours, is washed with dilute caustic alkali solution and then led through an alumina or silica gel or active carbon packed absorption column in which the reaction products are adsorbed. They are eluated with methanol. To the methanolic solution a methanolic solution of hydrazine hydrate is added, while stirring and cooling, until the blue color of the 1-chlor-1-nitrosocyclohexane has disappeared. The colorless neutral solution is then boiled under reflux until the blue color of the monomeric nitrosocyclohexane which develops by heating and dissociation of the colorless dimeric compound has disappeared. By working up the solution, almost pure cyclohexanone oxime is obtained in practically quantitative yields, calculated on the amount of bis-nitroso and 1-chlor-1-nitroso-compound present in the starting reaction mixture.

We claim:

1. A process for the preparation of a bis-nitrosohydrocarbon which comprises introducing a mixture of nitric oxide and chlorine, said nitric oxide being present in a ratio of about two mols to about 15 mols per mol of chlorine, into a liquid hydrocarbon selected from the group consisting of alkanes and cycloalkanes having from 5 to 12 carbon atoms at from about −10° C. to about +40° C., and irradiating the resulting reaction mixture with light of a wave length from about 350 to 700 millimicrons.

2. A process as defined in claim 1 wherein the liquid hydrocarbon is cyclohexane.

3. A process as defined in claim 1 wherein the liquid hydrocarbon is cyclooctane.

4. A process for the production of a bis-nitrosohydrocarbon which comprises introducing a mixture of nitric oxide and chlorine, said nitric oxide being present in a ratio of about two mols to about 15 mols per mol of chlorine, into a liquid hydrocarbon selected from the group consisting of alkanes and cycloalkanes having from 5 to 12 carbon atoms, said liquid hydrocarbon being saturated with its corresponding bis-nitrosohydrocarbon, at from about −10° C. to about +40° C., irradiating the resulting reaction mixture with light of a wave length from about 350 to 700 millimicrons, and separating the bis-nitrosohydrocarbon which crystallizes in the reaction mixture by filtration.

5. A process as defined in claim 4 wherein the liquid hydrocarbon is cyclohexane.

6. A process as defined in claim 4 wherein the liquid hydrocarbon is cyclooctane.

7. A process for the preparation of intermediate compounds including essentially a bis-nitrosohydrocarbon as the main product and a geminal chloro-nitrosohydrocarbon as a by-product in the production of ketoximes which comprises introducing a mixture of nitric oxide and chlorine, said nitric oxide being present in a ratio of about two mols to about 15 mols per mol of chlorine, into a liquid hydrocarbon selected from the group consisting of alkanes and cycloalkanes having from 5 to 12 carbon atoms at from about −10° C. to about +40° C., irradiating the resulting reaction mixture with light of a wave length from about 350 to 700 millimicrons, and separating the bis-nitrosohydrocarbon main product from the geminal chloro-nitrosohydrocarbon by-product.

8. A process for the production of ketoximes which comprises heating a bis-nitrosohydrocarbon selected from the group consisting of bis-nitrosoalkanes and bis-nitrosocycloalkanes having from 10 to 24 carbon atoms in an inert medium to about 50° C. to 150° C. to form the corresponding ketoxime.

9. A process as claimed in claim 8 wherein the bis-nitrosohydrocarbon is bis-nitrosocyclohexane.

10. A process as claimed in claim 8 wherein the bis-nitrosohydrocarbon is bis-nitrosocyclooctane.

11. A process for the production of ketoximes which comprises reacting a geminal chloro-nitrosohycarbon selected from the group consisting of geminal chloro-nitrosoalkanes and geminal chloro-nitrosocycloalkanes having from 5 to 12 carbon atoms with a reducing agent to form the corresponding ketoxime.

12. A process for the production of ketoximes which comprises introducing a mixture of nitric oxide and chlorine, said nitric oxide being present in a ratio of about two mols to about 15 mols per mol of chlorine, into a liquid hydrocarbon selected from the group consisting of alkanes and cycloalkanes having from 5 to 12 carbon atoms at from about −10° C. to about +40° C., irradiating the resulting reaction mixture with light of a wave length of from about 350 to 700 millimicrons, separating a bis-nitrosohydrocarbon main product and a geminal chloro-nitrosohydrocarbon by-product from the reaction mixture, heating the bis-nitrosohydrocarbon at from about 50° C. to 150° C. to form the corresponding ketoxime, and reacting the geminal chloro-nitrosohydrocarbon with a reducing agent to form the corresponding ketoxime.

13. A process for the production of ketoxime which comprises introducing a mixture of nitric oxide and chlorine, said nitric oxide being present in a ratio of about two mols to about 15 mols per mol of chlorine, into a liquid hydrocarbon selected from the group consisting of alkanes and cycloalkanes having from 5 to 12 carbon atoms at from about −10° C. to about +40° C., irradiating the resulting reaction mixture with light of a wave length from about 350 to 700 millimicrons until about 2% to 10% of the liquid hydrocarbon has reacted, washing the reaction mixture with a dilute caustic alkali solution, distilling off the excess liquid hydrocarbon, separating the reaction products including a bis-nitrosohydrocarbon main product and a geminal chloro-nitrosohydrocarbon by-product, heating the bis-nitrosohydrocarbon in an inert media to about 50° C. to 150° C. to form the corresponding ketoxime, and reacting the geminal chloro-nitrosohydrocarbon with a reducing agent to form the corresponding ketoxime.

14. A process for the production of ketoximes which comprises introducing a mixture of nitric oxide and chlorine, said nitric oxide being present in a ratio of about two mols to about 15 mols per mol of chlorine, into a liquid hydrocarbon selected from the group consisting of alkanes and cycloalkanes having from 5 to 12 carbon atoms at from about −10° C. to about +40° C., irradiating the resulting reaction mixture with light of a wave length from about 350 to 700 millimicrons until about 2 to 10% of the liquid hydrocarbon has been reacted, washing and drying the reaction mixture, distilling off the excess unreacted liquid hydrocarbon, and heating the residue to about 50° C. to 150° C.

15. A process as defined in claim 14 wherein the liquid hydrocarbon is cyclohexane.

16. A process as defined in claim 14 wherein the liquid hydrocarbon is cyclooctane.

17. A process for the production of ketoximes which comprises introducing a mixture of nitric oxide and chlorine, said nitric oxide being present in a ratio of about two mols to about 15 mols per mol of chlorine, into a liquid hydrocarbon selected from the group consisting of alkanes and cycloalkanes having from 5 to 12 carbon atoms at from about −10° C. to about +40° C., irradiating the resulting reaction mixture with light of a wave length from about 350 to 700 millimicrons, washing the reaction mixture with a dilute caustic alkali solution, adsorbing the reaction products including a bis-nitrosohydrocarbon main product and a geminal chloro-nitrosohydrocarbon by-product on an adsorbent, eluating said reaction products from the adsorbent with an inert polar solvent, reacting the geminal chloro-nitrosohydrocarbon in the eluate with a reducing agent to form its corresponding ketoxime, and heating the bis-nitrosohydrocarbon in the eluate to form its corresponding ketoxime.

18. A process for the production of cyclohexanone oxime which comprises introducing a mixture of about 2 to 15 volumes of nitric oxide and one volume of chlorine into cyclohexane at about 20° C. while irradiating with light having a wave length of from about 350 to 700 millimicrons until about 2% to 10% of the cyclohexane has reacted, washing the reaction mixture with diluted caustic alkali solution, distilling off the excess cyclohexane, subsequently distilling off the chloro-nitrosocyclohexane by-product from the bis-nitrosocyclohexane main product of the reaction, reducing the chloro-nitrosocyclohexane with hydrogen in the presence of platinum oxide to form cyclohexanone oxime, and heating the bis-nitrosocyclohexane to about 50° C. to 150° C. to transform it into cyclohexanone oxime.

19. A process for the production of ketoximes which comprises reacting a geminal chloro-nitrosohydrocarbon selected from the group consisting of geminal chloro-nitrosoalkanes and geminal chloronitrosocycloalkanes having from 5 to 12 carbon atoms with hydrogen in the presence of a hydrogenation catalyst containing a metal selected from the group consisting of platinum, palladium and nickel to form the corresponding ketoxime.

20. In the process of preparing cyclohexanone oxime in pure form by rearranging pure bis-nitrosocyclohexane, the improvement which consists in heat-treating the bis-nitrosocyclohexane dissolved in an inert solvent of ethanol at a temperature of from about 80 to 120° C. to effect complete rearrangement of said bis-nitrosocychlohexane to cyclohexanone oxime.

21. The process according to claim 20 in which the cyclohexanone oxime is recovered in pure form following distillation of the solvent.

References Cited in the file of this patent
UNITED STATES PATENTS

| | | |
|---|---|---|
| 1,733,462 | Kropp | Oct. 29, 1929 |
| 2,233,823 | Susie et al. | Mar. 4, 1941 |
| 2,297,351 | Gerhart | Sept. 29, 1942 |
| 2,340,271 | Lippincott et al. | Jan. 25, 1944 |
| 2,420,382 | Robertson | May 13, 1947 |
| 2,423,180 | Doumani et al. | July 1, 1947 |
| 2,496,198 | Butterbaugh | Jan. 31, 1950 |
| 2,709,179 | Ottenheym | May 24, 1955 |
| 2,719,116 | Brown | Sept. 27, 1955 |
| 2,721,219 | Welz | Oct. 18, 1955 |
| 2,721,880 | Welz | Oct. 25, 1955 |
| 2,805,253 | Pieper et al. | Sept. 3, 1957 |

FOREIGN PATENTS

| | | |
|---|---|---|
| 992,772 | France | July 11, 1951 |

OTHER REFERENCES

Chemical Reviews, vol. 48 (1951), page 324. 260–647.
Journal Chemical Society (1936), pp. 1005–6. (Copy in Sci. Lib.)
Journal Organic Chemistry, vol. 18 (1953), pp. 115–20 (Div. 56).
Baumberger: Ber. der Deut. Chem., vol. 44, 3066–72 (1911).
Muller et al.: Ber. der Deut. Chem., vol. 87, pp. 1282–93 (1954).
Muller et al.: Ber. der Deut. Chem., vol. 87, pp. 1449–60 (1954).
Muller et al.: Ber. der Deut. Chem., vol. 88, pp. 165–77 (1955).
Muller et al.: Ber. der Deut. Chem., vol. 88, pp. 1891–1905 (1955).
Muller et al.: Ber der Deut Chem., vol. 89, pp. 397–406 (1956).